Patented Mar. 8, 1938

2,110,614

UNITED STATES PATENT OFFICE 2,110,614

INSECTICIDE

Donald L. Vivian and Herbert L. Haller, Washington, D. C.; dedicated to the free use of the People of the United States No Drawing. Application May 10, 1937, Serial No. 141,766

5 Claims. (Cl. 167—33)

(Granted under the act of March 3, 1883, as amended April 30, 1928; 370 O. G. 757)

This application is made under the act of March 3, 1883, as amended by the act of April 30, 1928, and the invention, if patented, may be manufactured and used by or for the Government for governmental purposes without the payment to us of any royalty thereon.

We hereby dedicate the invention herein described to the free use of the People of the United States to take effect on the granting of a patent to us.

Our invention relates to improvements in material for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

We have found that organic compounds containing in addition to other groups and/or rings, a heterocyclic ring composed of four carbon and two nitrogen atoms, with the two latter in the 1, 4 (para) position, are effective in killing many species of insects whether applied externally or internally; that these organic products may be sprayed or dusted upon delicate vegetation without injuring it; that these materials are even more effective than lead arsenate and other commonly used insecticides and that they are relatively non-toxic to warm-blooded animals. Suitable products according to this invention are phenazine, naphthazines, and various derivatives of these compounds such as alkyl, cycloalkyl, aryl, amino, alkoxy, arylalkoxy, nitro, and halogeno derivatives. Substituents may also be attached directly to nitrogen, as for example in dihydrophenazine, induline, etc.

One of the preferred compounds comprised in our invention is phenazine. It may be reduced to impalpable powder by grinding and applied to vegetation either dry as a dust or wet as a spray. The product being soluble in refined mineral oils, may be applied as a component of an oil emulsion spray. When applied as a spray in water it is desirable to incorporate an effective wetting agent such as one of the so-called sulphonated oils. Phenazine may also be applied by dissolving it in acetone and pouring the acetone into water whereupon a fine colloidal precipitate is formed. This may be applied directly to plants or it may be combined with a suitable wetting agent and then sprayed.

It is to be understood that the above-mentioned compound was used in the above experiment merely as an example, and that this invention is not restricted by such use. Other compounds in this class, i. e., 2-aminophenazine, 2, 3-diaminophenazine, and induline spirit soluble have also proved to be toxic to codling moth larvae.

The value of phenazine as an insecticide is shown by the fact that when tested against codling moth larvae it was more effective than lead arsenate at the same concentration.

Having thus described our invention, what we claim for Letters Patent is:

We claim:

1. An insecticide containing as its essential active ingredient phenazine.
2. An insecticide containing as its essential active ingredient dihydrophenazine.
3. An insecticide containing as its essential active ingredient a dibenzoparadiazine.
4. An insecticide containing as its essential active ingredient a naphthazine.
5. An insecticide containing as its essential active ingredient a pyrazine.

DONALD L. VIVIAN.
HERBERT L. HALLER.